United States Patent [19]

Baek

[11] Patent Number: 5,304,877
[45] Date of Patent: Apr. 19, 1994

[54] ROTOR OF A CANNED MOTOR FOR A CANNED MOTOR PUMP

[75] Inventor: Woo S. Baek, Busan, Rep. of Korea
[73] Assignee: Gold Star Co., Ltd., Seoul, Rep. of Korea
[21] Appl. No.: 855,756
[22] Filed: Mar. 20, 1992
[51] Int. Cl.$^5$ .................................... H02K 15/12
[52] U.S. Cl. .................................... 310/45; 310/42
[58] Field of Search .............. 310/45, 42, 43, 125, 310/216; 417/9; 427/104, 118; 415/217.5, 915

[56] References Cited

U.S. PATENT DOCUMENTS

| | | | |
|---|---|---|---|
| 3,659,129 | 4/1972 | Pettersen | 310/216 |
| 3,902,087 | 8/1975 | Hakamada et al. | 310/43 |
| 4,007,386 | 2/1977 | Rustecki | 310/42 |
| 4,131,990 | 1/1979 | Roach | 29/598 |
| 4,588,915 | 5/1986 | Gold et al. | 310/45 |
| 4,827,167 | 5/1989 | Mayumi et al. | 310/42 |
| 5,068,560 | 11/1991 | Lundquist | 310/125 |

Primary Examiner—Steven L. Stephan
Assistant Examiner—Matthew Nguyen
Attorney, Agent, or Firm—Spencer, Frank & Schneider

[57] ABSTRACT

A rotor of a canned motor for a canned motor pump, which operates in fluid, includes a core assembly with a plurality of stacked cores each having a plurality of slots formed therein, a conductor portion integrally constituted by a plurality of rotor bars inserted into respective slots of the core assembly and opposite end rings disposed on the opposite sides of the core assembly, and a coating film formed on the outer surfaces of the core assembly and the conductor portion to prevent the fluid from permeating into them. The rotor has enhanced airtightness and anticorrosion properties and may be made of low-priced materials using a shortened manufacturing process, resulting in cost reduction.

28 Claims, 4 Drawing Sheets

ROTOR OF A CANNED MOTOR FOR A CANNED MOTOR PUMP

BACKGROUND OF THE INVENTION

1. Field of the Invention

This invention relates to a rotor of a canned motor for a canned motor pump, which performs rotation through electromagnetic interaction with a stator.

2. Description of the Prior Art

A canned motor pump having a canned motor mounted therein is generally of the type shown in FIG. 1 of the accompanying drawings, in which the motor is disposed at one side of the pump. The motor comprises a rotor 3 includes a core assembly having a plurality of stacked cores, and a rotary shaft 1 for rotating an impeller the shaft being 5, press-fitted into the central portion of the core assembly. The motor also included a stator 2 disposed peripherally of the rotor 3 in radially facing relation to the rotor, whereby the rotor 3 performs high speed rotation by electromagnetic interaction with the stator, so that a impeller 5 secured to one end of the rotary shaft 1 therewith is rotated, thereby pumping fluid.

Bearings 4 guide and support the opposite end portions of the shaft 1. Lubrication of the sliding contact surfaces between the rotary shaft 1 (which rotates at high speed) and bearings 4 is not provided by supplying separate lubricating oil; instead, the fluid that is being pumped is circulated into the interior of the motor portion. Therefore, the rotor of the motor for the canned motor pump must be arranged to meet the requirements of airtightness, preventing the fluid from permeating into the interior of the rotor and avoiding corrosion thereof.

To satisfy the requirements set forth above, the prior rotor employs the construction shown in FIGS. 2 and 3 of the accompanying drawings. A core assembly 3a includes stacked cores 6 each having a central aperture and a plurality of circumferentially spaced slots 10 formed thereon. Opposite end rings 8a and 8b (copper plates) are attached to the opposite sides of the core assembly, each end ring having a central aperture and slots corresponding to the central aperture and slots of the core. Copper wires or bars are inserted into the slots 10 and secured to the end rings 8a and 8b by welding. A a rotor can 9 of stainless material is disposed on the outer peripheral surface of the core assembly to enclose it, and the rotary shaft is 1 press-fitted into the central aperture of the combination of the core assembly and the end rings. Accordingly, permeation of fluid into the core assembly 3a comprising the cores 6 is prevented by the end rings 8a and 8b and the rotor can 9, which entirely surround the core assembly.

In this prior rotor, the end rings and rotor bars, which serve as rotor conductors, are made of copper, which increases the manufacturing cost of the product. Moreover the processes of inserting the rotor bars into the slots of the core assembly and then welding the bars to the end rings complicates the mannfacturing operation, thereby lowering productivity. In addition, since the rotor can which encloses the core assembly to prevent permeation of water from the outside is made of separate stainless material, the manufacturing cost is increased. Furthermore, the thickness of the rotor can itself increase the gap between the rotor and the stator by at least 0.2 mm, thereby lowering the efficiency of the motor. Moreover, even if the rotor can has ben accurately finished and mounted around the core assembly, the airtightness between the rotor can and the core assembly may not be properly maintained with use of the motor for a long time, resulting in permeation of the core assembly.

SUMMARY OF THE INVENTION

With the foregoing drawbacks of the prior art rotor in view, it is an object of the present invention to provide an improved rotor of a canned motor, which is relatively simple and inexpensive to manufacture and has enhanced airtightness and anticorrosion properties.

To achieve the above object, there is provided according to one form of the present invention a rotor of a canned motor for a canned motor pump comprising a core assembly comprised of a plurality of stacked cores each having a plurality of slots formed therein; a conductor portion integrally constituted by a plurality of rotor bars inserted into respective slots of the core assembly and opposite end rings disposed on the opposite sides of the core assembly; and a coating film formed on the outer surfaces of the core assembly and the conductor portion to prevent fluid from permeating into them.

BRIEF ESCRIPTION OF THE DRAWINGS

DESCRIPTION OF THE PREFERRED EMBODIMENT

The present invention will now be described in detail with refernce to FIGS. 4 through 7 of the accompanying drawings.

Figure 4:
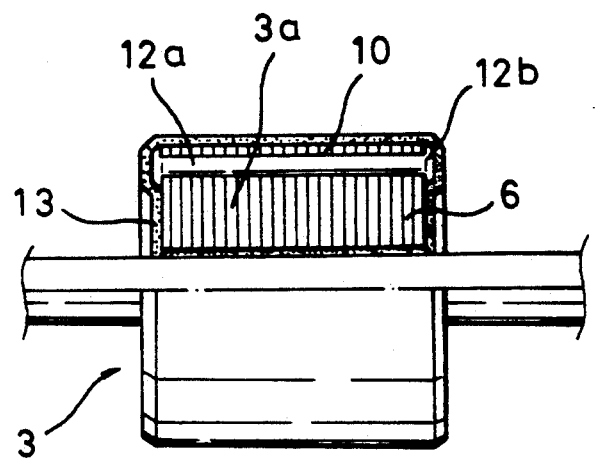
FIG. 4 is an elevation view, in partial section, of a rotor of a canned motor for a canned motor pump according to one embodiment of the present invention.

Referring to FIG. 4, a rotor of a canned motor for a canned motor pump according to one embodiment of the present invention has a construction that is similar to that of the prior art rotor in that it comprises a core assembly 3a composed of a plurality of stacked cores 6 each having a plurality of slots 10 formed therein, a plurality of rotor bars 12a inserted into respective slots 10 of the core assembly 3a, and a rotary shaft 1 press-fitted into the central portion of the core assembly. However, the rotor according to the present invention also comprises a conductor portion 12 integrally constituted by the rotor bars 12a that are inserted into the slots 10 of the core assembly 3a, and opposite end rings 12b serving to connect the rotor bars 12a to the opposite side surfaces of the core assembly.

Figure 5:
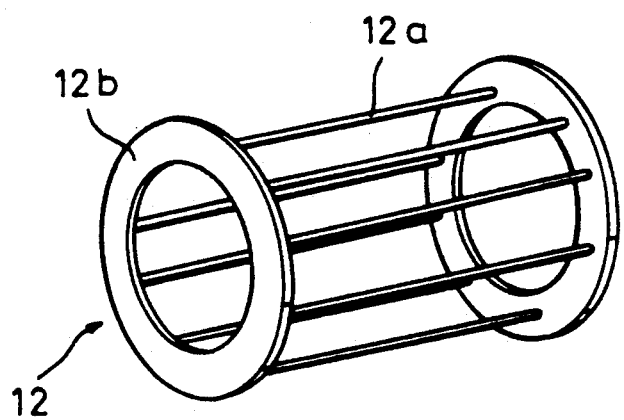
FIG. 5 is a perspective view of a conductor portion which is one of the essential parts of the present invention.

The conductor portion 12 thus formed is of the type shown in FIG. 5, and serves not only to join the cores 6 together, but also as a conductor of the rotor. In this case, the conductor portion 12 is preferably formed by diecasting low-priced aluminum material in a single process.

In addition, according to the present invention, there is provided a coating film 13 covering the entire outer surface of a rotor assembly including the core assembly 3a and the conductor portion 12. In the embodiment shown in FIG. 4 the coating film 13 is formed to cover not only the entire outer surface of the rotor assembly, but also the inner surface at the central aperture of the rotor assembly, into which the rotory shaft 1 is press-fitted, by performing the coating treatment of the rotor assembly itself prior to the press-fittin of the shaft 1 into the rotor assembly. However, the coating film may be applied after the shaft has been press-fitted. In this instance, when the rotor assembly with the rotary shaft press-fitted is plated, the coating treatment may be executed to coat only the rotor assembly portion, or, if necessary, the entire rotor comprising the rotor assembly and the rotory shaft press-fitted into the assembly. The coating film 13 prefereably comprises a plated film of strong corrosion resistance formed, for example, by an electroless plating treatment. Forming the plated film by electroless nickel plating is preferred.

Moreover, the film may be formed as a double-layered film including a first film and a second film applied over the first film. The first film is preferably formed by a chromium/zinc plating process and the second plated film is formed by a Dacro plating process. Such a double-layered film provides further enhanced durability of the rotor in comparison with single-layered plated.

Figure 6:
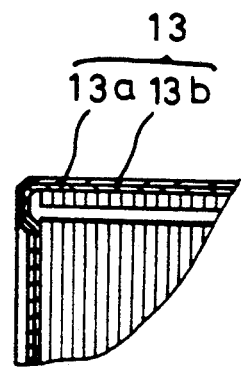
FIG. 6 is an enlarged cross-sectional view of a portion of a two-layered coating film according to another embodiment of the present invention.

Furthermore, the coating film 13 may be a painted film having strong corrosion resistance. Alternatively, in place of a single or double-layered plated film of the a painted film as discussed above, the coating film 13 may be formed, as in another embodiment that is shown in FIG. 6, as a doubler-layered film comprising an underlying plated film 13a having strong corrosion resistance and a painted film 13b applied over the plated film 13a, so that airtightness, durability and corrosion-resistance of the rotor may be further enhanced.

Figure 7:
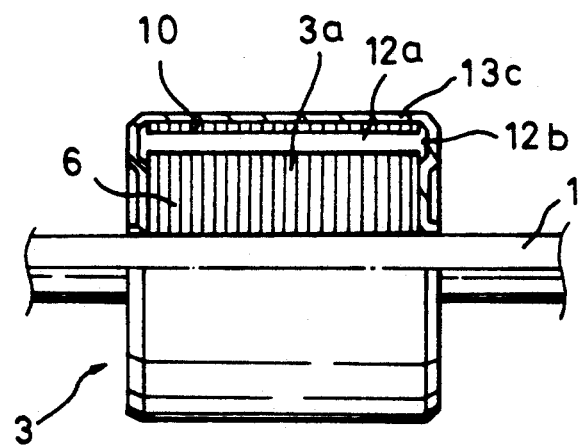
FIG. 7 is an elevation view, in partial section, of a rotor of a canned motor for a canned motor pump according to still another embodiment of the present invention.

Referring to FIG. 7, which shows the rotor of the canned motor according to still another embodiment of the present invention, the coating film covering the outer surface of the rotor assembly may be molded from rust-resistant molding material of plastic, etc., thereby preventing the fluid from permeating into and oxidating and corroding the rotor assembly.

In this instance, the molding material is preferably be unsaturated polyester resin.

Since the conductor portion of the rotor according to the present invention is integrally constituted, as described above, by the rotor bars and the end rings, both of which are diecast from low-priced aluminium material, the manufacturing cost is reduced and productivity is considerably enhanced.

In addition, since there is no clearance opening to the cores, owing to the coating film according to the present invention, (for example, a single-layered plated film, a double-layered plated film, a painted film, a double-layered film comprising a plated film and a painted film, and a molded film, and especially, a painted film formed by electroless nickel plating or a double-layered film formed by chromium/zince plating and the Dacro plating, which have superior anticorrosion properties over the stainless material of the rotor can of the prior rotor), the rotor assembly may be perfectly protected from permeation and corrosion by water.

Moreover, since the coating films according to various embodiments as set forth above have minute thickness of $5 \sim 30 \mu$, except for the molded film, the magnetic gap between the rotor and the stator may be considerably reduced as compared with the gap of 0.2 mm in the prior art rotor using the stainless can, thereby enhancing the efficiency of the motor. In addition, the plating process permits the rotor to be mass produced, which reduces the manufacturing cost and greatly enhances productivity.

The rotor of the canned motor according to the present invention can also be applied to motors, other than the canned motor pump as discussed above, which must operate in fluid.

Figure 1:
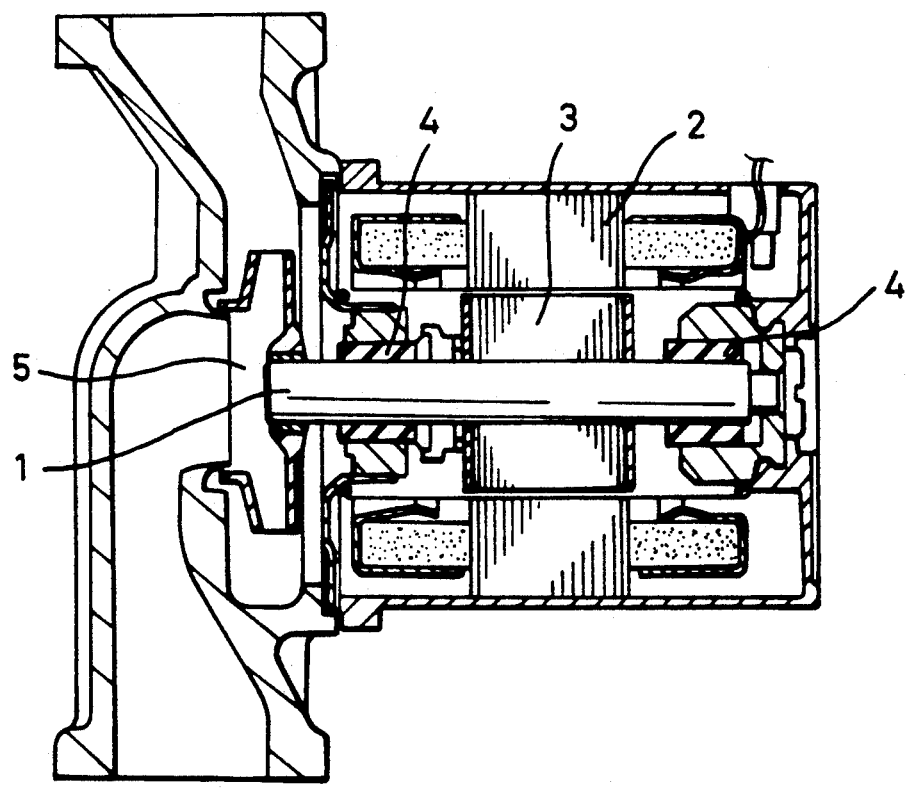
FIG. 1 is a cross-sectional view of a canned motor pump having a canned motor mounted therein.
Figure 2:
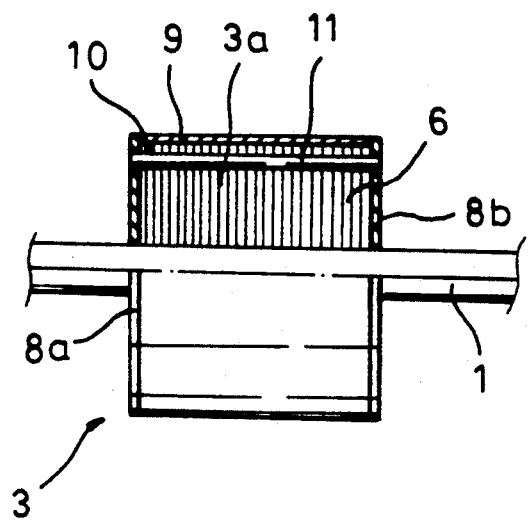
FIG. 2 is an elevation view, in partial section, of a rotor of a canned motor for a canned motor pump according to the prior art.
Figure 3:
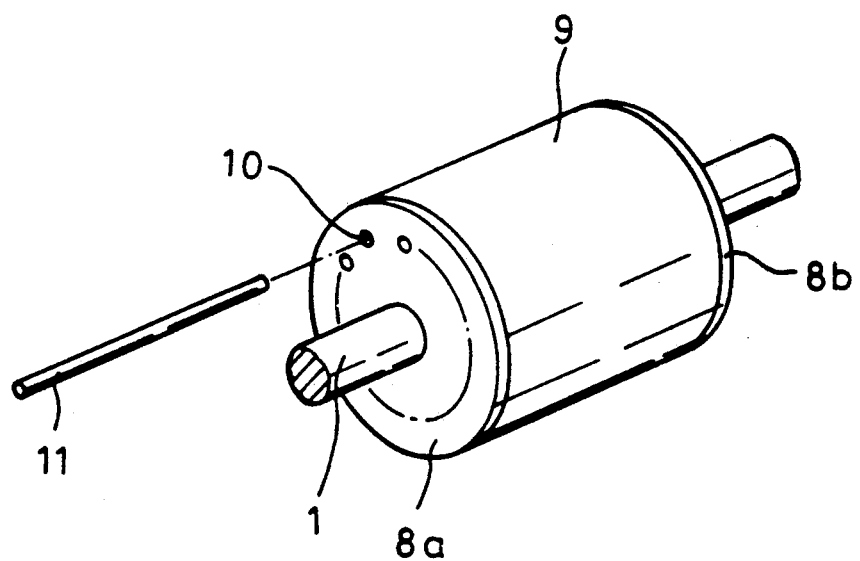
FIG. 3 is a perspective view of the rotor of the prior art canned motor.

Although the present invention has been applied to only the rotor portion in the canned motor pump shown in FIG. 1, it also is possible to additionally form a coating film on the inner surface of the stator 2 which coacts the rotor according to the present invention.

While the invention has been shown and described with particular reference to various embodiments thereof, it will be understood that variations and modifications may be made therein without departing from the spirit and scope of the invention as defined in the appended claims.

What is claimed is:

1. A rotor of a motor in a pump for pumping fluid, comprising:
   a core assembly including a plurality of cores with a plurality of slots and a hole for a shaft therein, said slots being arranged circumferentially and said hole being located centrally;
   a conductor portion having a plurality of rotor bars penetrating said slots respectively and a pair of end rings disposed at a pair of end planes of said core assembly respectively, said rotor bars and said end rings being formed integrally; and
   a fluid-proof coating film formed on outer surfaces of said core assembly and said conductor portion for preventing fluid inside said pump from permeating into said core assembly.

2. A rotor as claimed in claim 1, in which said conductor portion is formed by aluminum diecasting.

3. A rotor motor pump as claimed in claim 1, in which said coating film comprises a plated film having strong corrosion resistance.

4. A rotor as claimed in claim 3, in which said plated film is an electroless nickel plated film.

5. A rotor as claimed in claim 1, in which said coating film comprises a first plated film having strong corrosion resistance and a second plated film on said first plated film.

6. A rotor as claimed in claim 5, in which said first plated film is formed by a chromium/zinc plated process, and said second plating film is formed by a Dacro plating process.

7. A rotor as claimed in claim 1, in which said coating film comprises a painted film having strong corrosion resistance.

8. A rotor as claimed in claim 1, in which said coating film comprises a multi-layered film which includes a plated film and a painted film.

9. A rotor as claimed in claim 3, in which the thickness of said coating film is in the range of $5 \sim 30 \mu$.

10. A rotor as claimed in claim 1, in which said coating film is made from a molding material.

11. A rotor as claimed in claim 10, in which said molding material comprises unsaturated polyester resin.

12. A rotor as claimed in claim 5, in which the thickness of said coating film is in the range of 5~30µ.

13. A rotor as claimed in claim 6, in which the thickness of said coating film is in the range of 5~30µ.

14. A rotor as claimed in claim 7, in which the thickness of said coating film is in the range of 5~30µ.

15. A rotor of a motor in a pump for pumping fluid, comprising:
   a shaft;
   a core assembly including a plurality of cores with a plurality of slots and a hole for said shaft therein, said slots being arranged circumferentially and said hole being located centrally;
   a conductor portion having a plurality of rotor bars penetrating said slots respectively and a pair of end rings disposed at a pair of end planes of said core assembly respectively, said rotor bars and said end rings being formed integrally; and
   a fluid-proof film formed on outer surfaces of said core assembly and said conductor portion and said shaft fitted into said hole for preventing fluid inside said pump from permeating into said core assembly.

16. A rotor as claimed in claim 15, in which said conductor portion is formed by aluminum diecasting.

17. A rotor as claimed in claim 15, in which said coating film comprises a plated film having strong corrosion resistance.

18. A rotor as claimed in claim 15, in which said coating film comprises a first plated film having strong corrosion resistance and a second plated film on said first plated film.

19. A rotor as claimed in claim 15, in which said coating film comprises a painted film having strong corrosion resistance.

20. A rotor as claimed in claim 15, in which said coating film comprises a multi-layered film which includes a plated film and a painted film.

21. A rotor as claimed in claim 15, in which said coating film is made from a molding material.

22. A rotor for a motor, comprising:
   a core assembly which includes a first core member, a second core member, and a plurality of intermediate core members that are disposed between the first and second core members to form a core stack, the core stack having a central bore which extends through the first and second core members and the intermediate core members, the core stack additionally having a generally cylindrical outer periphery which includes curved portions and slots between the curved portions;
   a first end ring contacting the first core member;
   a second end ring contacting the second core member;
   a plurality of bars which are connected to the end rings and which are disposed in the slots; and
   fluid-proofing means for keeping fluid out of the core stack, the fluid-proofing means including a coating film having a first radially-extending end portion that is deposited on the first core member and the first end ring, a second radially-extending end portion that is deposited on the second core member and the second end ring, and a generally cylindrical intermediate portion that is deposited on the bars and the curved portions of the outer periphery of the core stacks, the intermediate portion of the coating film being seamlessly connected to the first and second end portions.

23. The rotor of claim 22, wherein the bore has a bore wall, and wherein the coating film additionally has a portion which is deposited on the bore wall and which is seamlessly connected to the first and second end portions.

24. The rotor of claim 22, wherein the first and second end rings and the bars are integrally connected and are provided by a conductor portion that is made by diecasting.

25. The rotor of claim 22, wherein the coating film comprises a plated metal film.

26. The rotor of claim 22, wherein the coating film further comprises another film that is deposited onto the plated metal film.

27. The rotor of claim 22, wherein the coating film comprises a painted film having strong corrosion resistance.

28. The rotor of claim 22, wherein the coating film comprises a layer of molding material.

* * * * *

UNITED STATES PATENT AND TRADEMARK OFFICE
CERTIFICATE OF CORRECTION

PATENT NO. : 5,304,877
DATED : April 19, 1994
INVENTOR(S) : Woo Sung Baek

It is certified that error appears in the above-indentified patent and that said Letters Patent is hereby corrected as shown below:

```
Title page, item [30], under Foreign Priority Documents:   insert--
Mar. 20, 1991        Korea.....3712/1991
Jun. 21, 1991        Korea.....9248/1991--.
```

Signed and Sealed this

Ninth Day of August, 1994

Attest:

BRUCE LEHMAN

*Attesting Officer*  *Commissioner of Patents and Trademarks*